United States Patent
Kwong et al.

(10) Patent No.: US 7,813,409 B2
(45) Date of Patent: Oct. 12, 2010

(54) SECURE NETWORK USING ORTHOGONAL FREQUENCY DIVISION MULTIPLEXING SPREAD SPECTRUM COMMUNICATIONS

(75) Inventors: Herman Kwong, Kanata (CA); Kah Ming Soh, Kanata (CA); Bryan Parlor, Ottawa (CA); Aneta Wyrzykowska, Dunrobin (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1111 days.

(21) Appl. No.: 11/236,230

(22) Filed: Sep. 27, 2005

(65) Prior Publication Data

US 2007/0071067 A1    Mar. 29, 2007

(51) Int. Cl.
    *H04B 1/00* (2006.01)
(52) U.S. Cl. .................................................. 375/130
(58) Field of Classification Search ................ 375/130, 375/131, 138, 140, 135, 136, 146, 147; 370/208, 370/334; 455/101
    See application file for complete search history.

(56) References Cited

U.S. PATENT DOCUMENTS

| | | | |
|---|---|---|---|
| 2005/0002324 A1* | 1/2005 | Sutivong et al. | 370/208 |
| 2005/0094597 A1* | 5/2005 | Hwang et al. | 370/329 |
| 2005/0220002 A1* | 10/2005 | Li et al. | 370/208 |
| 2006/0023666 A1* | 2/2006 | Jalali et al. | 370/334 |
| 2006/0128323 A1* | 6/2006 | Fujimoto | 455/101 |

* cited by examiner

*Primary Examiner*—Sam K Ahn
(74) *Attorney, Agent, or Firm*—Guerin & Rodriguez, LLP; William G Guerin

(57) ABSTRACT

Described are a method and system for secure transmission of data through a network. A subcarrier sequence for data transmission is generated. The subcarrier sequence designates at least one subcarrier from a number of orthogonal subcarriers for each of a plurality of intervals in a time sequence. The subcarrier sequence is provided to a receiver. A data signal that includes the subcarriers identified in the subcarrier sequence modulated according to the data is transmitted from a transmitter to the receiver. For additional security, the subcarrier sequence can be transmitted to the receiver using a communications channel that is separate from the communications channel for the data signal. The data signal is detected at the receiver and demodulated according to the subcarrier sequence.

17 Claims, 9 Drawing Sheets

SECURE NETWORK USING ORTHOGONAL FREQUENCY DIVISION MULTIPLEXING SPREAD SPECTRUM COMMUNICATIONS

FIELD OF THE INVENTION

The invention relates generally to security implementation in telecommunications networks. More particularly, the invention relates to a method for providing secure transmission of data through a network using orthogonal frequency division multiplexing spread spectrum communications.

BACKGROUND OF THE INVENTION

Network security represents an important challenge for telecommunications networks. Communications between users at geographically separate locations over a network enables the users to share information; however, the opportunity for unauthorized or unintended access to the information exists. For example, sensitive information such as confidential business, financial and personal data transmitted through the network can sometimes be retrieved without the consent or knowledge of the sender. Others without authorized access to the network can interfere with communications by corrupting or modifying data, or otherwise jamming transmissions.

As the number and availability of telecommunications networks increase, so too does the need for network security that protects the information while maintaining availability to authorized users and organizations. Although private networks significantly limit the opportunities for security breaches, opportunities increase when a portion of the telecommunications network or the entire network resides in the public domain.

Different technologies have been employed to achieve various levels of network security. Encryption and scrambling techniques are often used to reduce the vulnerability of transmitted data. These techniques can be complex and often do not efficiently utilize the available network bandwidth. For example, "frequency hopping" is used to transmit data by modulating the data with a carrier signal that changes from one frequency to another as a function of time over a range of frequencies. However, only one of the available carrier frequencies is utilized at a given time and, therefore, the available system bandwidth is underutilized.

What is needed is a method to provide increased network security and to achieve high bandwidth utilization. The present invention satisfies these needs and provides additional advantages.

SUMMARY OF THE INVENTION

In one aspect, the invention features a method for secure transmission of data through a network. A subcarrier sequence for data transmission is generated. The subcarrier sequence designates at least one subcarrier from a plurality of orthogonal subcarriers for each of a plurality of intervals in a time sequence. The subcarrier sequence is provided to a receiver and a data signal comprising a modulation of the subcarriers identified in the subcarrier sequence according to the data is transmitted.

In another aspect, the invention features a communications system for secure transmission of data through a network. The communications system includes a sequence generator to generate a subcarrier sequence designating at least one subcarrier from a plurality of orthogonal subcarriers for each of a plurality of intervals in a time sequence. The communications system also includes a transmitter in communication with the sequence generator. The transmitter is configured to transmit a data signal comprising a modulation of the subcarriers designated in the subcarrier sequence according to the data.

In yet another aspect, the invention features a method for secure transmission of data through a network in an orthogonal frequency division multiplexing communication session between a transmitter and a receiver. A subcarrier is generated for transmission of the data. The subcarrier sequence designates at least one subcarrier from a plurality of orthogonal subcarriers for each of a plurality of intervals in a time sequence. The subcarrier sequence is transmitted to the receiver. An acknowledgement is transmitted from the receiver indicating that the subcarrier sequence was received. A data signal is transmitted from the transmitter to the receiver through the network. The data signal comprises a modulation of the subcarriers designated in the subcarrier sequence according to the data.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

In brief overview, the invention relates to a method and system for secure transmission of data through a network. A subcarrier sequence for data transmission is generated. The subcarrier sequence designates at least one subcarrier from a number of orthogonal subcarriers for each of a plurality of intervals in a time sequence. The subcarrier sequence is provided to a receiver. A data signal that includes the subcarriers identified in the subcarrier sequence is modulated according to the data is transmitted from a transmitter to the receiver. For additional security, the subcarrier sequence can be transmitted to the receiver using a communications channel that is separate from the communications channel for the data signal. The data signal is detected at the receiver and demodulated according to the subcarrier sequence.

Figure 1A:
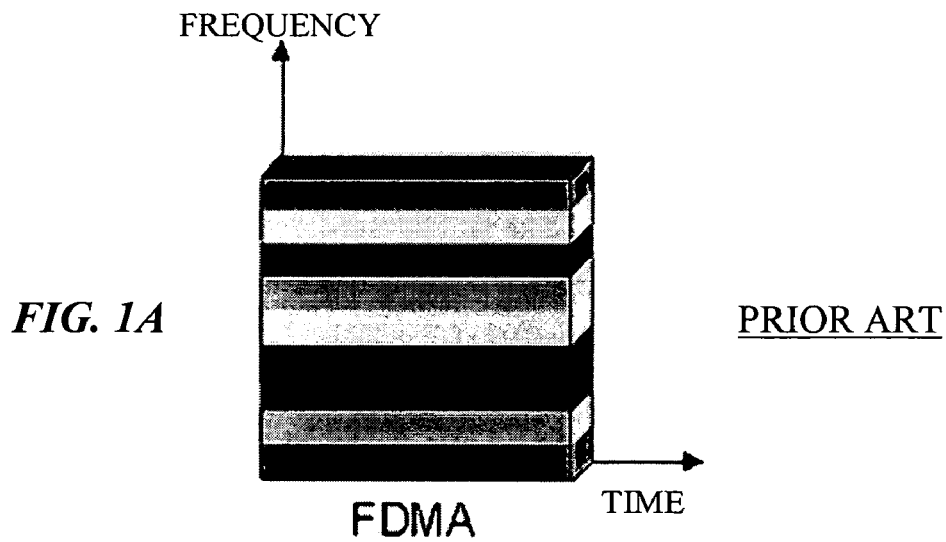
FIG. 1A graphically illustrates frequency utilization as a function of time for a plurality of communication device pairs in a frequency division multiple access system.
Figure 1B:
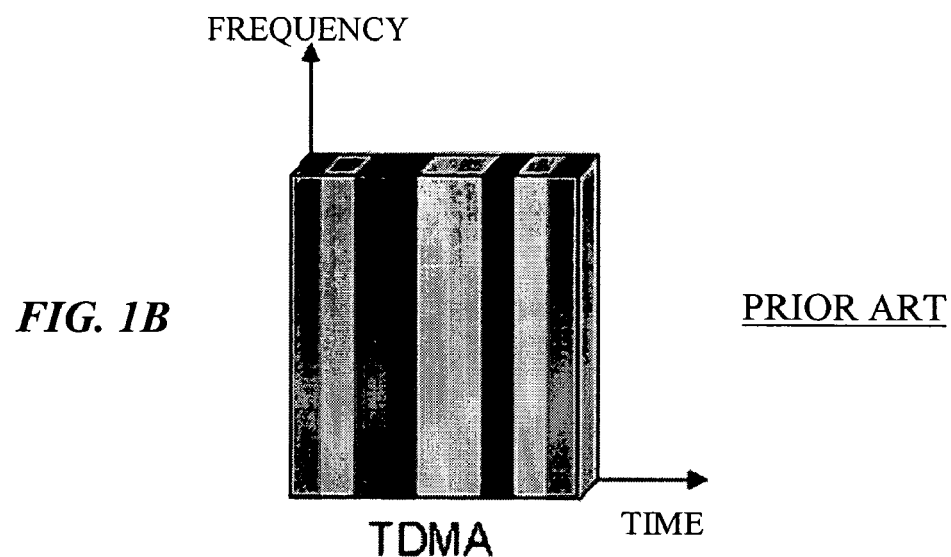
FIG. 1B graphically illustrates frequency utilization as a function of time for a plurality of communication devices pairs in a time division multiple access system.
Figure 1C:
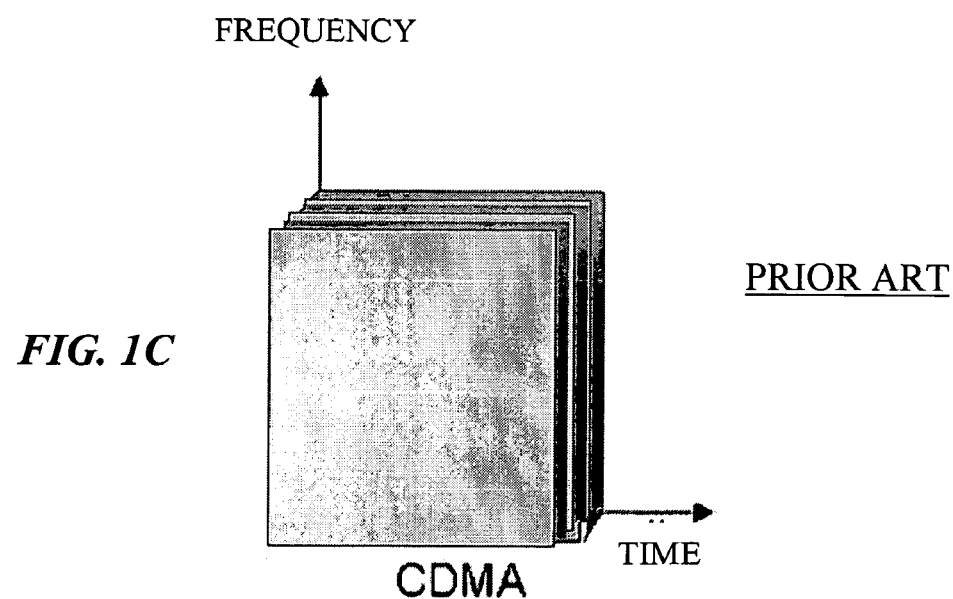
FIG. 1C graphically illustrates frequency utilization as a function of time for a plurality of communication device pairs in a code division multiple access system.

FIG. 1A graphically depicts frequency utilization as a function of time for communication devices in a frequency division multiple access (FDMA) system. The frequency range allocated to a particular pair of communication devices is limited to a fixed portion of the total communications bandwidth and remains unchanged over time. Frequency utilization as a function of time for communication devices in a time division multiple access (TDMA) system is shown in FIG. 1B. Each pair of communication devices is allocated the entire frequency spectrum for a respective portion of a time frame. FIG. 1C graphically depicts frequency utilization as a function of time for communication devices in a code division multiple access (CDMA) system. CDMA systems use a spreading code unique to each device. In contrast to FDMA and TDMA systems, each communication device transmits a signal that occupies the entire defined spectrum all the time although the bandwidth required to send the information is generally substantially smaller. Thus all communicating devices use the same frequencies and can transmit at the same time.

FDMA and TDMA systems cannot readily implement frequency allocation or time slot allocation to accommodate dynamic changes in traffic volume. In addition, FDMA and TDMA systems are generally inefficient in the use of the available frequency spectrum. Moreover, these systems typically require special encryption techniques to achieve high levels of data security.

Frequency hopping is one known technique for providing telecommunications security. A signal containing the information to be transmitted is mixed with a carrier signal having a frequency that "hops" in time between available values within a range of frequencies. Thus the mixed signal is centered at a frequency that changes frequently in time. The receiver is synchronized with the transmitter to enable proper demodulation of the mixed signal to retrieve the information.

Figure 2:
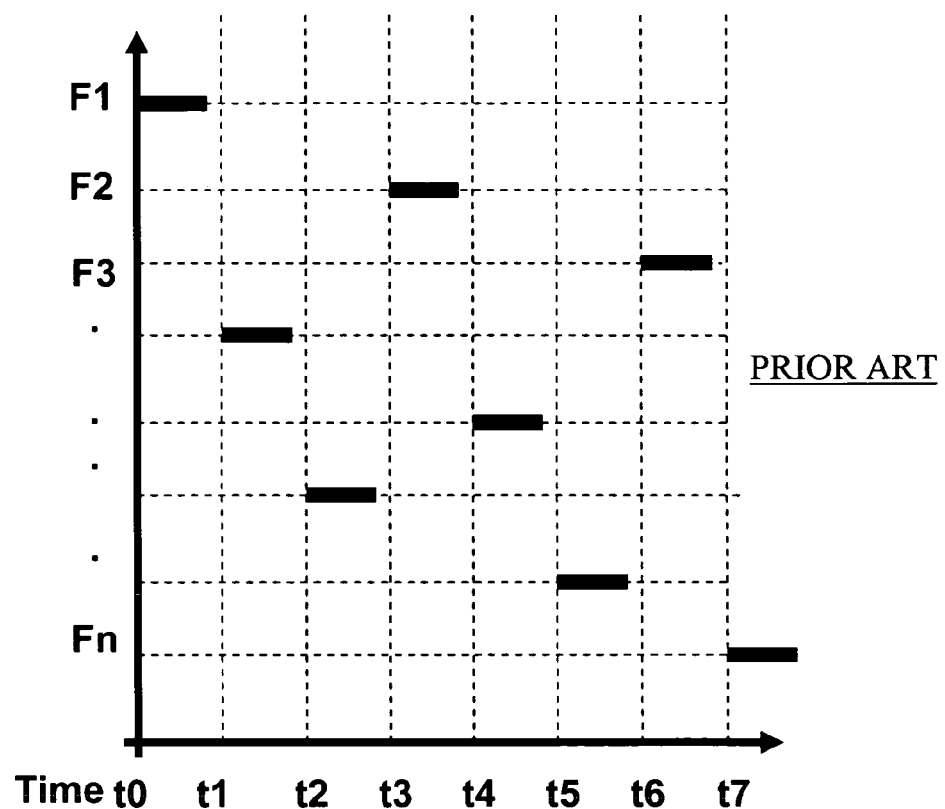
FIG. 2 graphically illustrates an example of carrier frequency as a function of time for a conventional frequency hopping security technique.

FIG. 2 graphically illustrates an example of frequency hopping where, for constant time intervals, the information signal is mixed with one of a limited number n of subcarriers at frequencies F1 to Fn within a fixed frequency range. The carrier frequency of the transmitted signal is depicted by a bold horizontal line segment for each time interval. A significant portion of the total spectrum remains unused. In particular, the unused subcarriers in each time interval result in an inefficient bandwidth utilization.

The method of the present invention provides for secure transmission of information through a network. In one embodiment, a subcarrier sequence is generated. The subcarrier sequence includes a designation (i.e., assignment) of at least one subcarrier from a plurality of orthogonal subcarriers to be used during each time interval in a time sequence. The subcarrier sequence is provided to the intended receiver, for example, over a communications channel that is separate from the channel used for transmitting the information. Optionally, the receiver can send an acknowledgement to a transmitter indicating that the subcarrier sequence was received. The transmitter then sends a data signal that includes a modulation of the subcarriers identified in the subcarrier sequence according to the information to be transmitted. The data signal is detected at the receiver and demodulated according to the subcarrier sequence. The method can be used with a variety of network types including wireless networks, wired networks, optical networks, and combinations of networks of different types.

In contrast to TDMA, FDMA and CDMA networks, the method of the invention provides dynamic frequency allocation access in which multiple frequencies are used to identify the communications between devices. The dynamic bandwidth allocation permits grouped subcarriers (i.e., subcarriers of consecutive frequencies that are "bundled" together), of two or more ungrouped subcarriers (i.e., subcarriers that are not a member of a subcarrier group), or a combination of grouped and ungrouped subcarriers. In addition, multiple subcarriers can be used simultaneously for transmission of a single data signal. In another advantage, additional data sources can transmit using other subcarriers, resulting in a greater bandwidth utilization than possible using conventional frequency hopping techniques.

Figure 3:
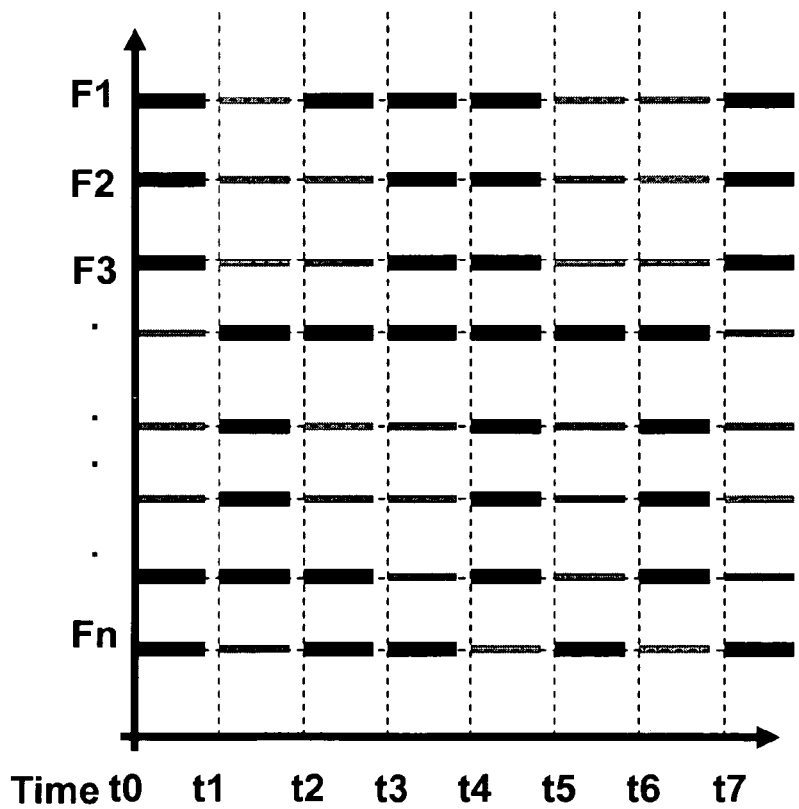
FIG. 3 graphically illustrates an example of subcarrier utilization as a function of time for an embodiment of a method for providing secure transmission of data in accordance with the invention.

FIG. 3 graphically illustrates an example of subcarrier utilization as a function of a time for eight equal duration time intervals and n subcarriers in accordance with an embodiment of the invention. Bold horizontal line segments represent the use of a respective subcarrier for the corresponding time interval and thin line segments represent unused subcarriers. Although only eight subcarriers are depicted for clarity, it should be recognized that any number of subcarriers are contemplated. For example, there may be hundreds or thousands of available subcarriers in an OFDM network.

During the interval between times t0 and t1 in the illustrated time sequence, data are transmitted using two subcarrier groups. The first subcarrier group includes subcarriers at frequencies F1, F2 and F3, and the second subcarrier group includes carriers at frequencies Fn−1 and Fn. The time interval between times t2 and t3 includes two ungrouped subcarriers at frequencies F1 and F4, and a subcarrier group at frequencies Fn−1 and Fn. Fewer data are being transmitted during this time interval compared to the interval between times t0 and t1, therefore the total number of subcarriers used is less.

The number of users transmitting data can vary. For example, all the subcarriers transmitting data can be allocated to a single user. Alternatively, the used subcarriers can be allocated to two or more users transmitting data at the same time.

The "unused subcarriers" can be used to transmit padded data or "dummy data." Padded data as used herein refers to data that have no value to the user but which provide increased security by complicating the efforts of unauthorized users to access and determine the transmitted information. Similar to subcarriers that transmit data, the subcarriers transmitting padded data are generally different for each time interval. In another embodiment, the padded data illustrated in FIG. 3 are replaced, at least in part, with data for additional users to further improve bandwidth utilization.

Figure 4:
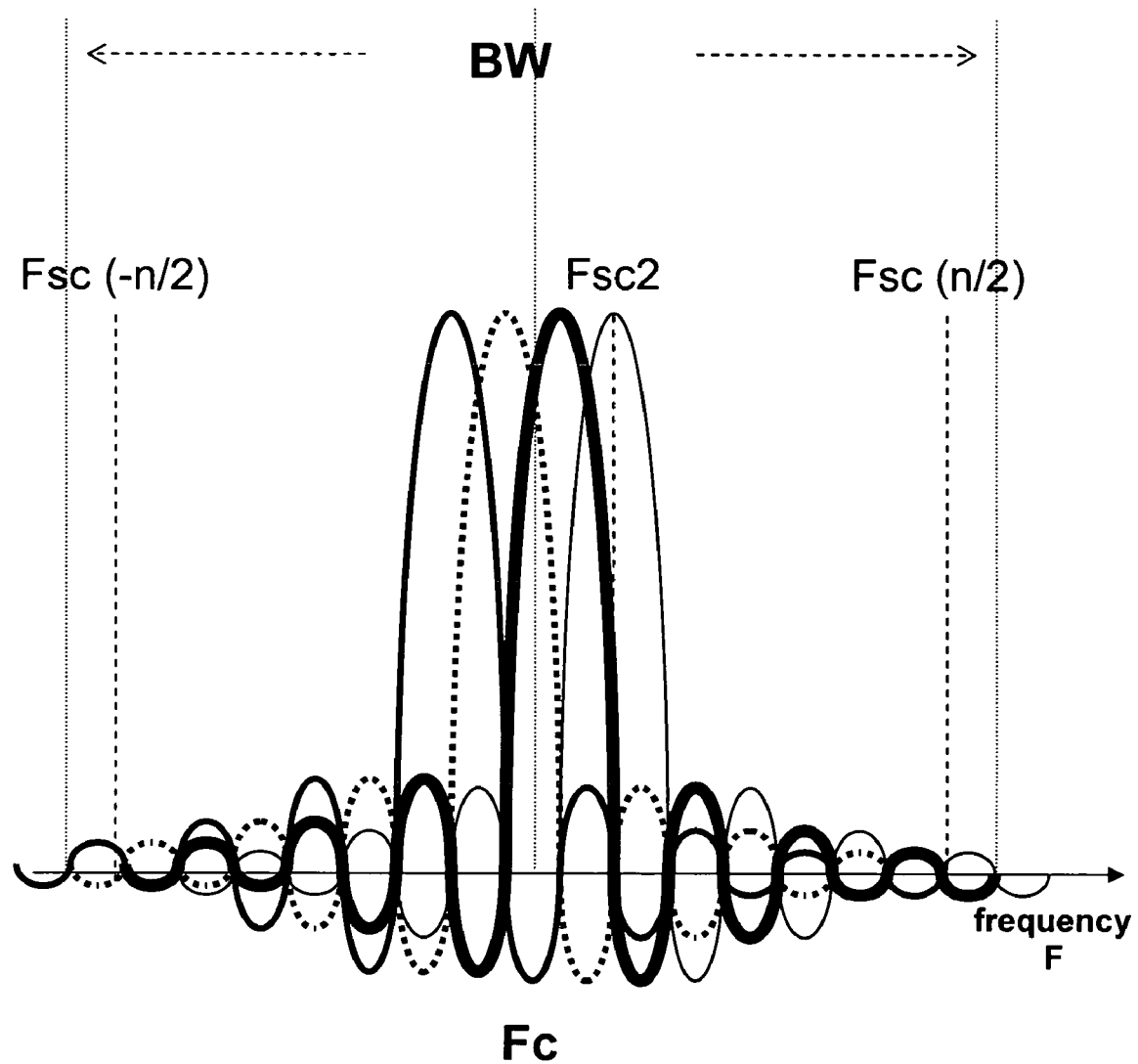
FIG. 4 illustrates a single designated subcarrier used to transmit data for a single user during an interval of a time sequence.

FIG. 4 graphically illustrates the amplitude of orthogonal subcarriers as a function of frequency F. Frequencies are designated as Fscx where x is an index corresponding to the "distance" of the subcarrier frequency from a center frequency Fc. For example, Fsc-1 and Fsc1 represent the frequencies for the subcarriers having the highest frequency below the center frequency Fc and the lowest frequency above the center frequency Fc, respectively. Only four subcarriers spaced about the center frequency Fc are shown for clarity. Each subcarrier is separated in frequency such that its maximum power occurs at a null of each of the other subcarriers.

The center frequency Fc, the number of orthogonal subcarriers and the total bandwidth BW can vary according to the specific OFDM implementation. A wireless network implementation may have a center frequency of several gigahertz and there can be hundreds or thousands of orthogonal subcarriers. For example, a 256 subcarrier OFDM system can be implemented in a channel bandwidth of 1.75 MHz, 3.0 MHz, 3.5 MHz, 10 MHz or similar bandwidth. The total bandwidth BW can limit the number of subcarriers, the subcarrier bandwidths or both. Generally, as the number of subcarriers is increased, so too are the number of data users that can be supported as long as the data rates of each user do not exceed the data capacity enabled by the subcarrier bandwidths. More than one subcarrier can be used to support traffic for a data user with greater data rate requirements.

Figure 5:
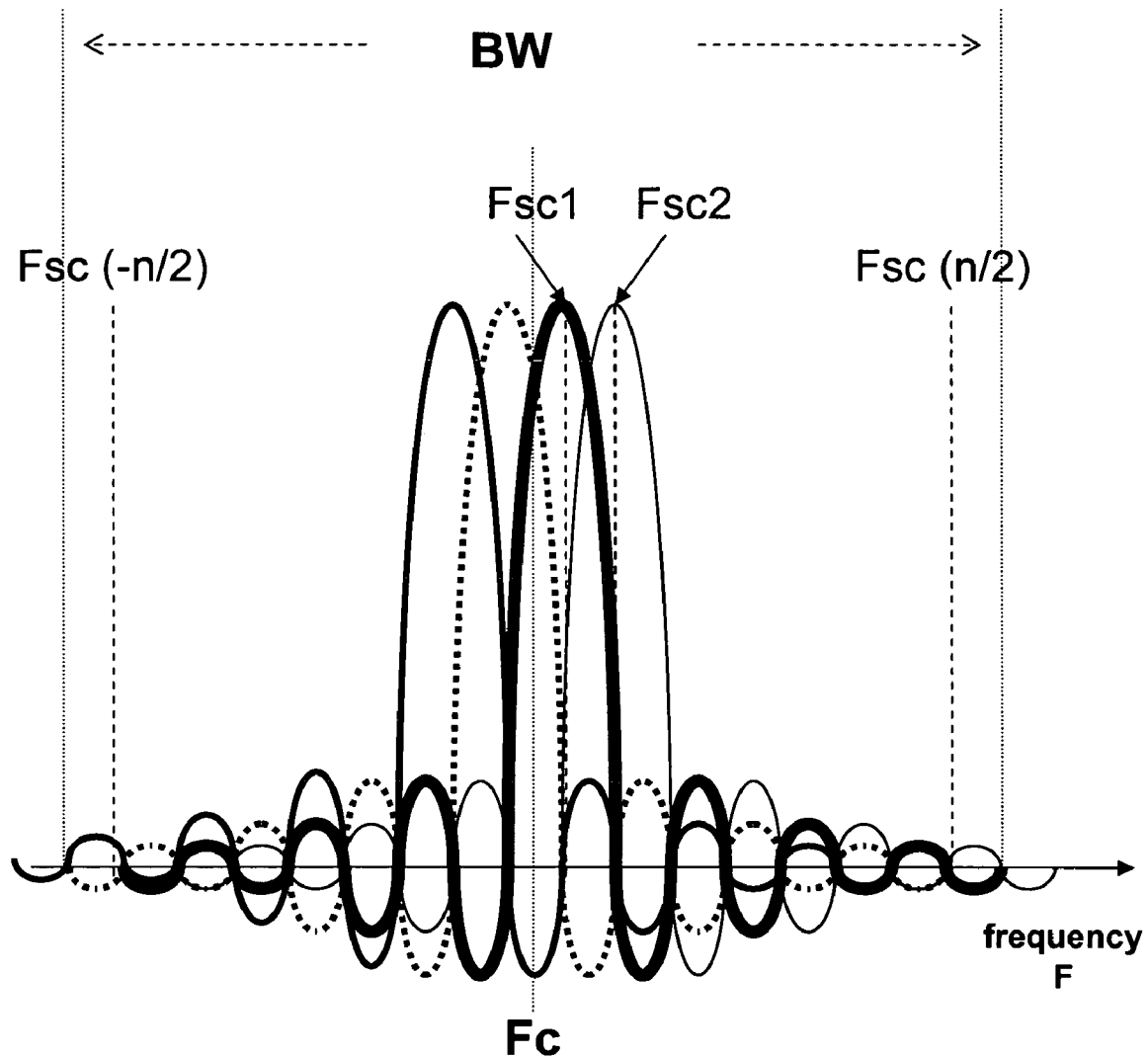
FIG. 5 illustrates a designation of a group of subcarriers used to transmit data for a single user during an interval of a time sequence.
Figure 6:
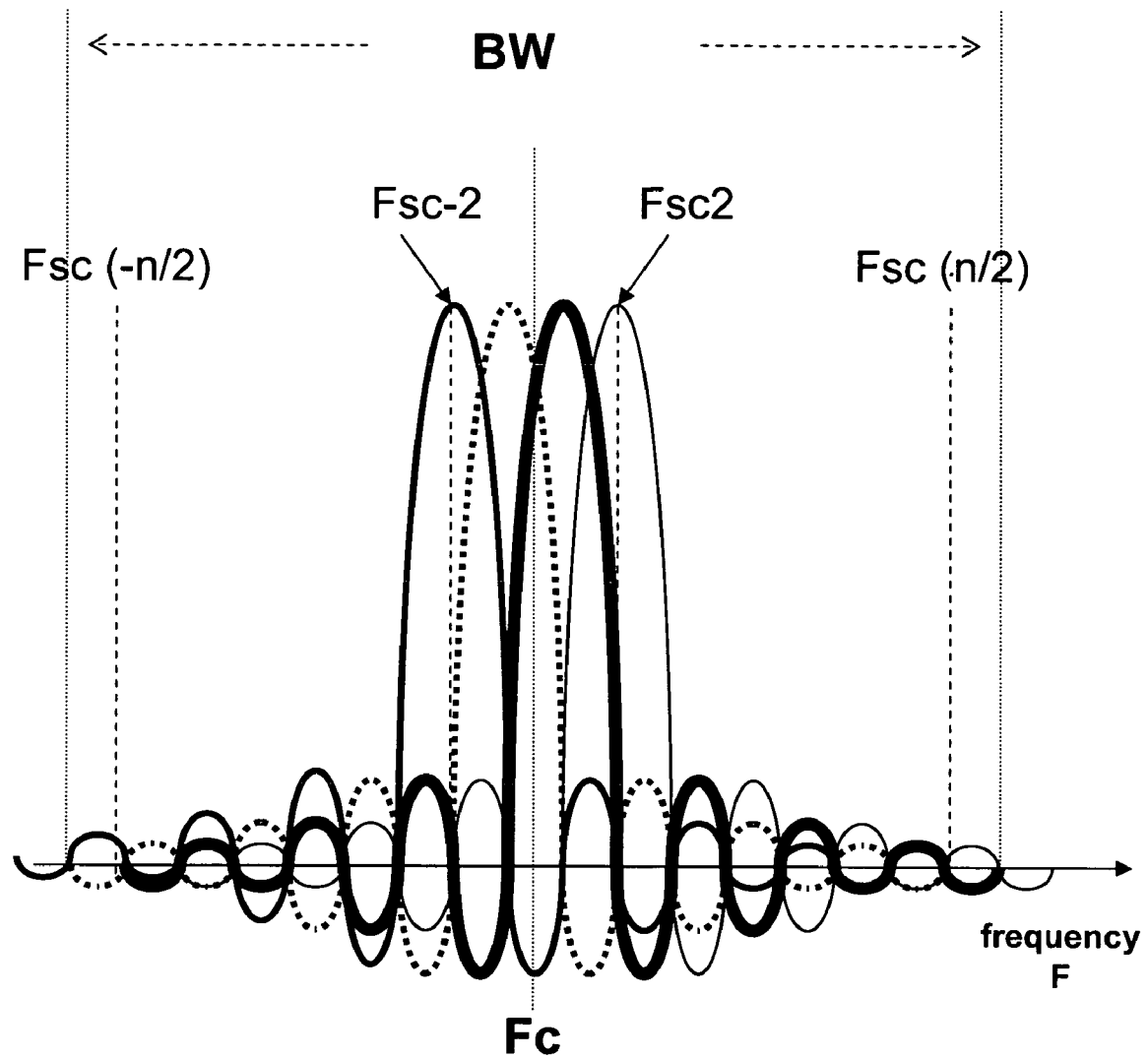
FIG. 6 illustrates a designation of ungrouped subcarriers used to transmit data for a single user during an interval of a time sequence.
Figure 7:
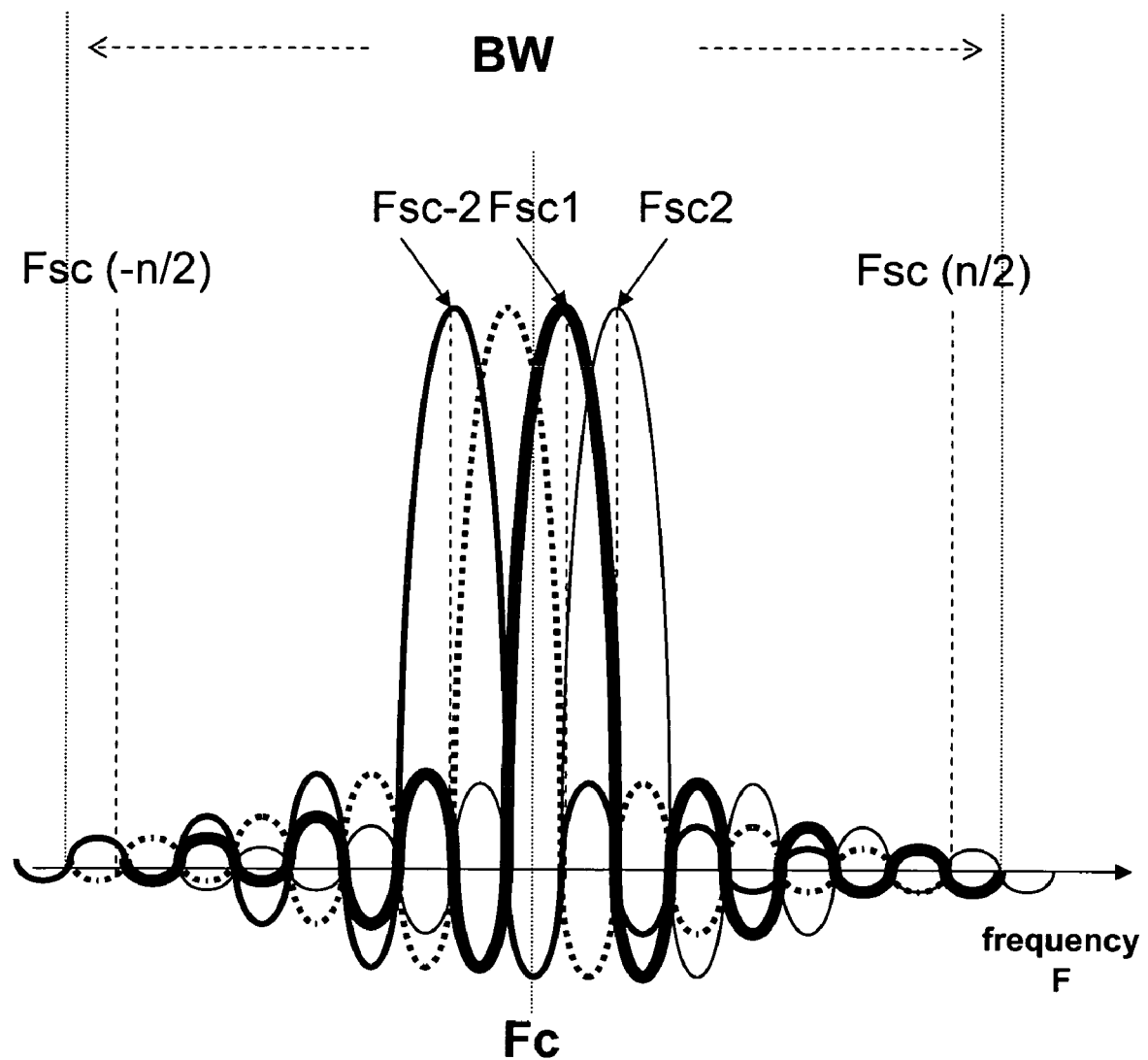
FIG. 7 illustrates a designation of grouped and ungrouped subcarriers used to transmit data for a single user during an interval of a time sequence.

In FIG. 4, only one subcarrier at frequency Fsc2 is assigned for a user for the corresponding time interval. The other subcarriers carry padded data or data for other simultaneous users. FIG. 5 shows a subcarrier group at frequencies Fsc1 and Fsc2 that is used to transmit data for a single user during the time interval. FIG. 6 shows two ungrouped subcarriers at frequencies Fsc-2 and Fsc2 that are used to transmit data for a single user during the time interval. FIG. 7 shows a combination of grouped and ungrouped subcarriers used to transmit data for the user. The grouped subcarriers are at frequencies Fsc1 and Fsc2, and the ungrouped carrier is at frequency Fsc-2.

Figure 8:
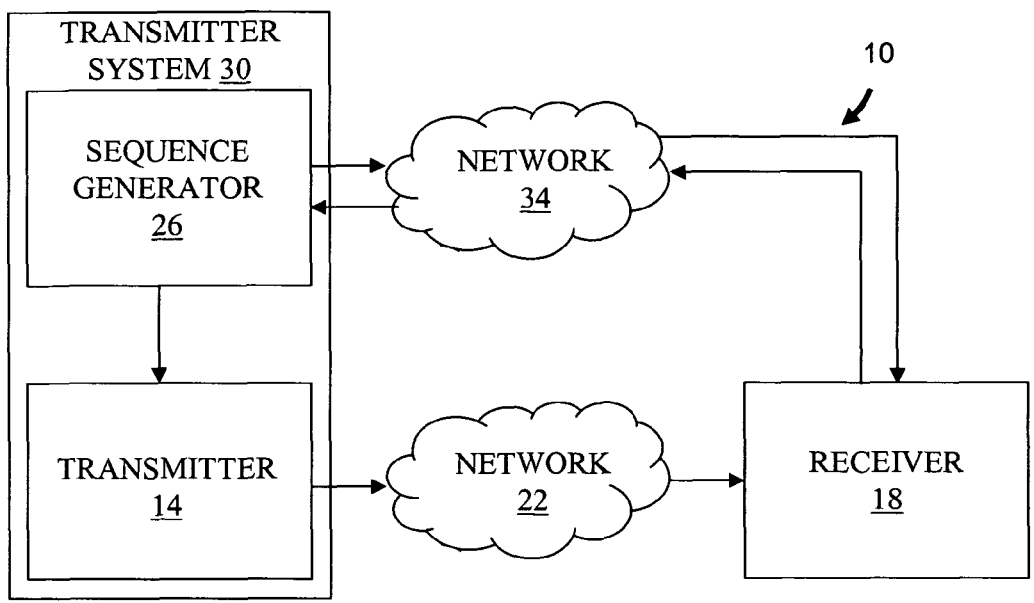
FIG. 8 is a block diagram illustration of a transmitter communicating with a receiver over a secure telecommunications network in accordance with the invention.
Figure 9:
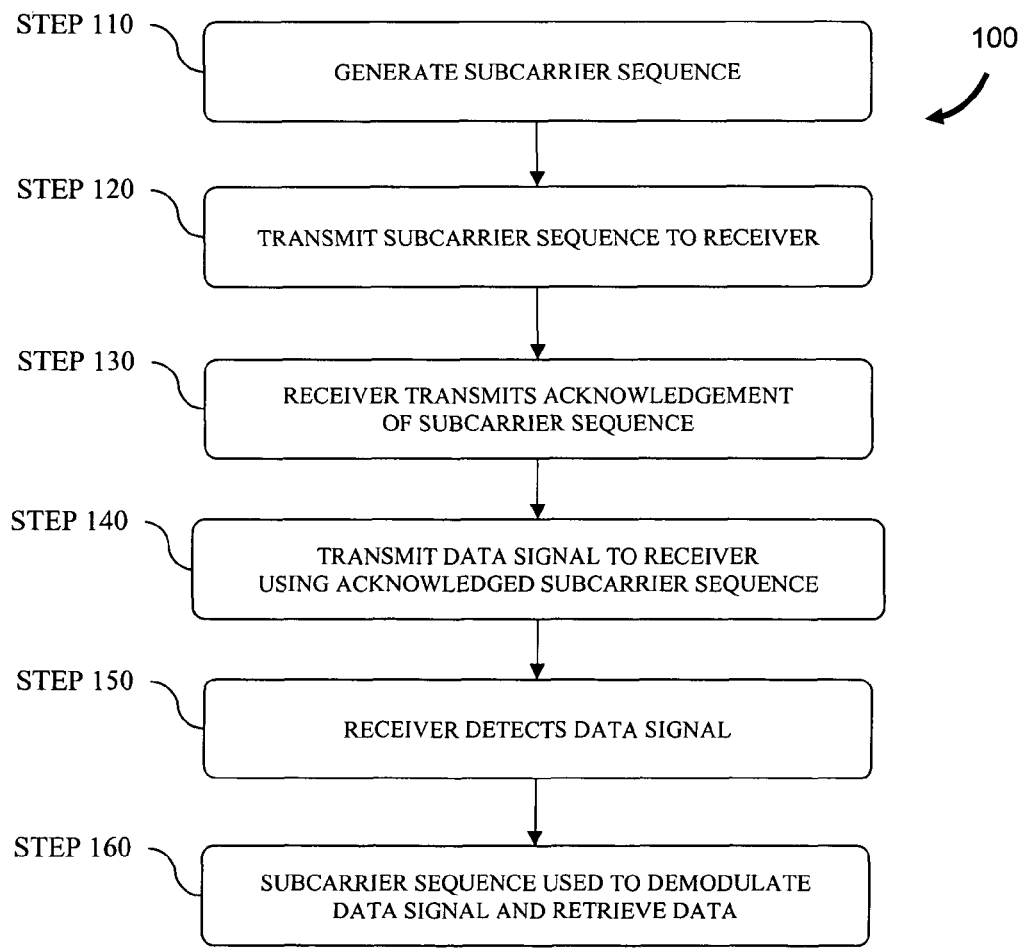
FIG. 9 is a flowchart representation of an embodiment of a method for secure transmission of data through a network in accordance with the invention.

FIG. 8 is a block diagram illustrating a telecommunications link 10 that includes a transmitter 14 and a receiver 18 for secure transmission of data over a network 22 in accordance with the invention. The transmitter 14 communicates with a sequence generator 26 to receive a subcarrier sequence to be used during subsequent data transmission. As illustrated, the transmitter 14 and sequence generator 26 are integrated components of a transmitter system 30; however, in other embodiments, the sequence generator 26 can be remotely located with respect to the transmitter 14. The receiver 18 is in communication with the sequence generator 26 through a separate communications channel or network 34 to receive the subcarrier sequence. FIG. 9 is a flowchart representation of an embodiment of a method 100 for secure transmission of data through a network.

Referring to FIG. 8 and FIG. 9, the subcarrier sequence is generated (step 110) by the sequence generator 26. The subcarrier sequence includes a time-dependent designation of subcarriers to be used for data transmission. More specifically, the subcarrier sequence specifies an assignment of subcarriers to be used in each time interval of a time sequence. The designated subcarriers are a subset of a plurality of orthogonal subcarriers defined on a fixed set of frequencies. In one embodiment, the subcarrier sequence includes a pseudo-random designation of the available subcarriers. In another embodiment, two or more subcarrier sequences can be generated for the same time sequence. Each of the two or more sequences includes an exclusive designation of subcarriers for a common time interval. Stated otherwise, the subcarrier sequences never "share" a subcarrier during the same time interval. Thus two or more exclusive subcarrier sequences are used when transmitting two or more data signals simultaneously.

The subcarrier sequence is transmitted (step 120) to the receiver 18 to permit the receiver 18 to synchronize with the transmitter 14 and retrieve the data from the transmitted signal. As illustrated, the subcarrier sequence is transmitted through a communications channel in a network 34 that is independent of the telecommunications network 22 used to send the data. Using two separate communications channels provide an additional layer of security. In other embodiments the telecommunications network 22 used for the data transmission is also used for sending the subcarrier sequence.

After receiving the subcarrier sequence and determining that the sequence is not corrupted or otherwise logically improper, the receiver 18 transmits (step 130) an acknowledgement to the sequence generator 26. The transmitter 14 then transmits (step 140) a data signal to the receiver 18. However, if no acknowledgement is received from the receiver 18 after a predefined duration, the transmitter 14 re-transmits the subcarrier sequence or a new subcarrier sequence. Retransmission is repeated until an acknowledgment is received or a predefined number of "retries" occurs and the transmitter 14 declares an error condition.

For each time interval of the time sequence, the data signal includes a modulation of the subcarrier frequencies designated for that time interval using the data values. The data signal is then detected (step 150) by the receiver 18 and demodulated (step 160) to retrieve the user data using the same subcarrier sequence synchronized to the data signal.

Figure 10:
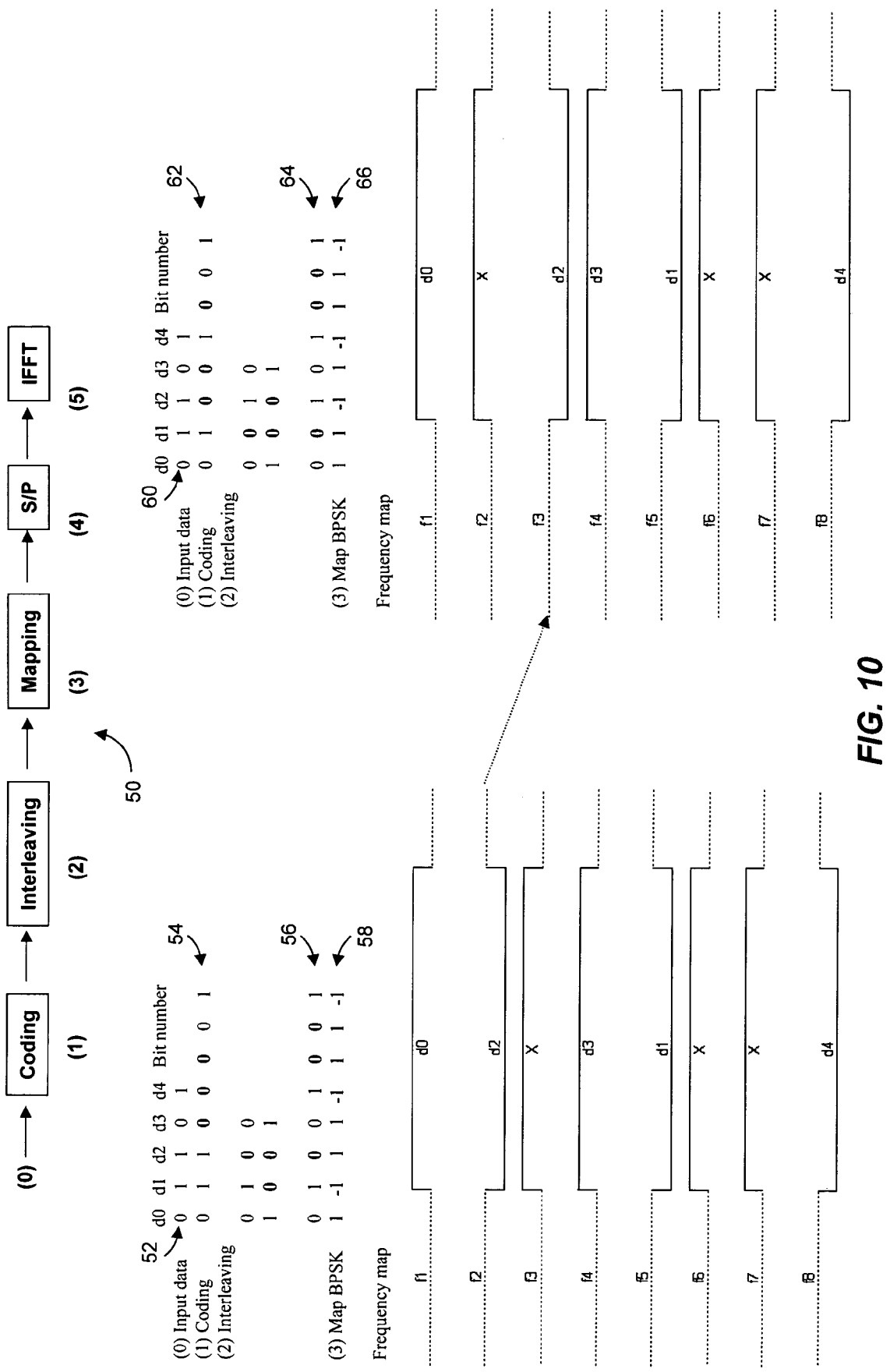
FIG. 10 illustrates an example of subcarrier sequence generation in which time-dependent coding is used in the designation of the subcarriers for two consecutive time intervals.

FIG. 10 illustrates an example of how time-dependent coding is used to designate the subcarriers for two consecutive time intervals in a subcarrier sequence. The example is based on an eight point inverse fast Fourier transform (IFFT). The five steps used for subcarrier mapping are summarized as a flowchart 50.

In the upper left portion of the figure, the input data for a first time interval are shown as a five bit sequence 52 with bits labeled d0 to d4. The coding step (1) includes insertion of three zeros (bolded for clarity) as "padded data" between bits d2 and d3 to generate an eight bit coded data sequence 54. Next, the interleaving step (2) includes interleaving the bits of the coded sequence 54 according to a specific algorithm to generate an interleaved sequence 56 "0 1 0 0 1 0 0 1".

The bits of the interleaved sequence 56 are mapped according to a binary phase shift keying (BPSK) modulation technique wherein zero values and one values are mapped (sequence 58) to positive and negative phase shifts, respectively, of their respective subcarriers. In other embodiments, other modulation techniques are utilized. For example, quadrature phase shift keying (QPSK) and various quadrature amplitude modulation schemes (e.g., 16QAM, 64QAM, 256QAM) can be employed. The designation of the subcarrier frequencies f1 to f8 for the coded data during the corresponding time interval is graphically depicted at the lower left of the figure with the vertical axis representing the BPSK phase shift used to code the binary value of each bit. The padded bits are represented by the letter "X".

In the upper right portion of the figure, the input data for a second time interval are shown again as a five bit sequence 60. For this interval, the coding step (1) includes insertion of two zeros as between bits d1 and d2, and a third zero between bits d2 and d3 to generate a different eight bit coded data sequence 62. Thus the "spreading" of the data bits is different. Again, the interleaving step (2) includes interleaving the bits of the coded sequence 62 according to a specific algorithm to generate an interleaved sequence 64 "0 0 1 0 1 0 0 1". Although the five data bits during this interval are identical in value to the five data bits in the prior interval and the interleaving technique is identical, the interleaved sequences 56 and 64 differ due to the different insertion locations of the padded data. Again, the interleaved sequence 64 is mapped to BPSK values as shown by sequence 66. The designation of the subcarrier frequencies f1 to f8 for the coded data for this time interval is graphically depicted at the lower right of the figure. The subcarrier frequency for the transmission of the third data bit d2 has changed from frequency f2 to frequency f3.

Figure 11:
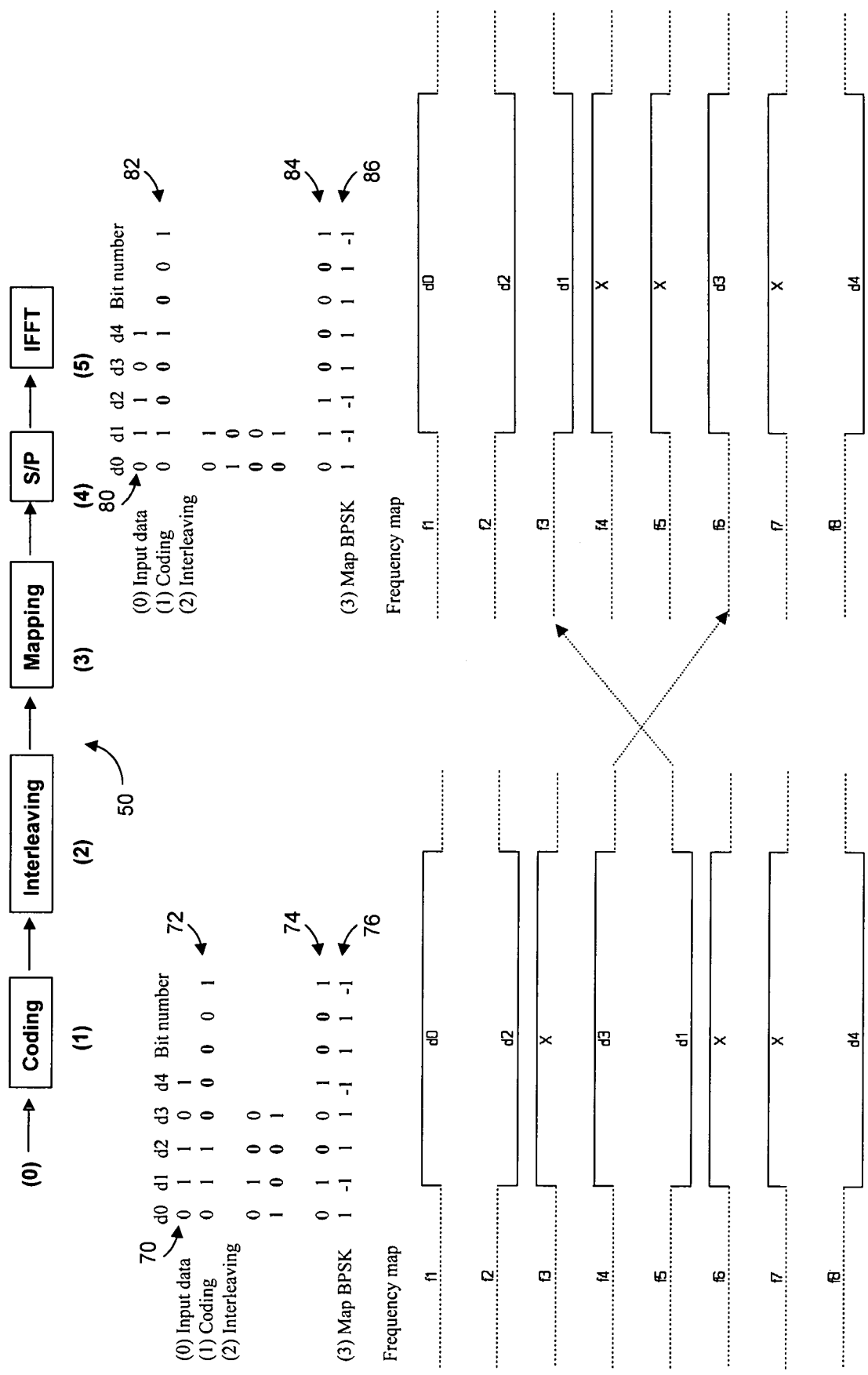
FIG. 11 illustrates an example of subcarrier sequence generation in which time-dependent coding and time-dependent interleaving are used in the designation of the subcarriers for two consecutive time intervals.

FIG. 11 illustrates an example using time-dependent coding and time-dependent interleaving to designate the subcarriers for two consecutive time intervals in a subcarrier sequence. In the upper left portion of the figure, the input data for a first time interval are shown as a five bit sequence 70. Similar to the prior example, the coding step (1) includes insertion of three zeros as "padded data" between bits d2 and d3 to generate an eight bit coded data sequence 72 and the interleaving step (2) includes interleaving the bits of the coded sequence 72 according to a specific algorithm to generate an interleaved sequence 74 "0 1 0 0 1 0 0 1". The data values, coding, interleaving and BPSK mapped sequence 76 are identical to those described for the first interval of the example in FIG. 10. Consequently, the designations of the subcarrier frequencies f1 to f8, shown graphically at the lower left of FIG. 11, are also identical.

In the upper right portion of the figure, the input data for a second time interval are shown as a five bit sequence 80. The coding step (1) includes insertion of two zeros as between bits d1 and d2, and a third zero between bits d2 and d3 to generate a new eight bit coded data sequence 82. Unlike the prior example, the performance of the interleaving step (2) is changed between the intervals so that the bits of the coded sequence 82 are interleaved, according to a second algorithm that is different from the first algorithm, resulting in an interleaved sequence 84 "0 1 1 0 0 0 0 1". Again, the interleaved sequence 84 is mapped to BPSK values as shown by sequence 86. The designation of the subcarrier frequencies f1 to f8 for the coded data for this time interval is graphically depicted at the lower right of the figure. The subcarrier frequency for the transmission of the second data bit d1 has changed from f5 to f3 and the subcarrier frequency for the fourth data bit d3 has changed from f4 to f6.

The "scrambling" of subcarrier designations according to the example of FIG. 10 provides a significant obstacle for unauthorized individuals or groups attempting to gain access to data transmitted through the network. The additional feature of changing the interleaving technique between time intervals, as described for the example of FIG. 11, further complicates efforts to intercept the data.

While the invention has been shown and described with reference to specific embodiments, it should be understood by those skilled in the art that various changes in form and detail may be made therein without departing from the spirit and scope of the invention.

What is claimed is:

1. A method for secure transmission of data through a network, the method comprising:
   generating a subcarrier sequence for data transmission, the subcarrier sequence designating at least one subcarrier from a plurality of orthogonal subcarriers for each interval in a plurality of intervals in a time sequence;
   providing the subcarrier sequence to a receiver; and
   transmitting a data signal comprising a modulation of the subcarriers identified in the subcarrier sequence according to the data.

2. The method of claim 1 further comprising:
   detecting the data signal at the receiver; and
   demodulating the detected data signal according to the subcarrier sequence.

3. The method of claim 1 further comprising transmitting to the receiver a data signal comprising a modulation of the subcarriers designated in an exclusive subcarrier sequence.

4. The method of claim 1 further comprising transmitting padded data on at least one subcarrier not defined in an interval for each of the intervals in the subcarrier sequence.

5. The method of claim 1 further comprising providing an acknowledgement of the subcarrier sequence by the receiver prior to the step of transmitting the data signal.

6. The method of claim 1 wherein the subcarrier sequence is transmitted to the receiver using a separate communications channel.

7. The method of claim 1 wherein the subcarrier sequence is pseudo-randomly generated.

8. The method of claim 1 wherein the data are transmitted on a single one of the orthogonal subcarriers for each of the intervals.

9. The method of claim 1 wherein the data are transmitted on a plurality of grouped subcarriers.

10. The method of claim 1 wherein the data are transmitted on a plurality of ungrouped subcarriers.

11. The method of claim 1 wherein the data are transmitted on a combination of grouped and ungrouped subcarriers.

12. The method of claim 1 wherein generating a subcarrier sequence comprises generating a time-dependent coding of a data sequence.

13. The method of claim 1 wherein generating a subcarrier sequence comprises generating a time-dependent interleaving of a data sequence.

14. A communications system for secure transmission of data through a network, the communications system comprising:
   a sequence generator to generate a subcarrier sequence designating at least one subcarrier from a plurality of orthogonal subcarriers for each interval in a plurality of intervals in a time sequence; and
   a transmitter in communication with the sequence generator, the transmitter configured to transmit a data signal comprising a modulation of the subcarriers designated in the subcarrier sequence according to the data.

15. The communications system of claim 14 further comprising a receiver in communication with the sequence generator and the transmitter, the receiver configured to demodulate the data signal according to the subcarrier sequence.

16. The communications system of claim 15 wherein the receiver is in communication with the sequence generator and the transmitter through separate communications channels.

17. A method for secure transmission of data through a network in an orthogonal frequency division multiplexing communication session between a transmitter and a receiver, the method comprising:
   generating a subcarrier sequence for transmission of the data, the subcarrier sequence designating at least one subcarrier from a plurality of orthogonal subcarriers for each interval in a plurality of intervals in a time sequence;

transmitting the subcarrier sequence to the receiver;

transmitting an acknowledgement from the receiver indicating that the subcarrier sequence was received; and transmitting a data signal from the transmitter to the receiver through the network, the data signal comprising a modulation of the subcarriers designated in the subcarrier sequence according to the data.

* * * * *